United States Patent [19]

Doty

[11] Patent Number: 5,273,728
[45] Date of Patent: * Dec. 28, 1993

[54] MIXED METAL LAYERED HYDROXIDE/FUMED SILICA ADDUCTS

[75] Inventor: Peter A. Doty, Midland, Mich.

[73] Assignee: The Dow Chemical Company, Midland, Mich.

[*] Notice: The portion of the term of this patent subsequent to Dec. 12, 2005 has been disclaimed.

[21] Appl. No.: 825,794

[22] Filed: Jan. 21, 1992

Related U.S. Application Data

[63] Continuation of Ser. No. 577,405, Sep. 4, 1990, abandoned.

[51] Int. Cl.$^5$ .................. B01V 13/00; C01B 33/28
[52] U.S. Cl. ................... 423/328.1; 423/331; 423/332; 252/28; 507/140; 507/143
[58] Field of Search .............. 423/331, 332, 333, 326, 423/328.1, 329; 252/315.5, 315.6, 28, 8.514

[56] References Cited

U.S. PATENT DOCUMENTS

| | | | |
|---|---|---|---|
| 4,392,979 | 7/1983 | Lee et al. | 252/184 |
| 4,392,980 | 7/1983 | Lee et al. | 252/184 |
| 4,446,201 | 5/1984 | Lee et al. | 428/696 |
| 4,664,843 | 5/1987 | Burba, III et al. | 252/315.5 |
| 4,790,954 | 12/1988 | Burba, III et al. | 252/315.5 |
| 4,990,268 | 2/1991 | Burba, III et al. | 252/8.514 |

Primary Examiner—Olik Chaudhuri
Assistant Examiner—Ken Horton

[57] ABSTRACT

Fine particle silica, especially fumed silica (FS), is interacted, in aqueous medium, with a substantially crystalline mixed metal layered hydroxide (MMLH) of the formula shown below to form a novel adduct, MMLH-SiO$_2$, as an aqueous gell which is shear-thinning and which has rapid gelation times, the said MMLH comprising the general formula $$Li_m D_d T(OH)_{(m+2d+3+n.a)}(A^n)_a \cdot qH_2O \qquad (I)$$

where: m is from zero to about 1; D represents divalent metal ions; d is from zero to about 4; T represents trivalent metal ions; A represents monovalent or polyvalent anions or negative-valence radicals other than OH— ions; a is the number of ions of A; n is the valence of A; n-a is from zero to about −3; q is zero or more; (m+d) is greater than zero; and (m+2d+3+n.a) is equal to or greater than 3.

7 Claims, 1 Drawing Sheet

MIXED METAL LAYERED HYDROXIDE/FUMED SILICA ADDUCTS

Cross-Reference to Related Application

This is a continuation of application Ser. No. 07/577,405, filed Sep. 4, 1990, now abandoned.

FIELD OF THE INVENTION

Adducts of mixed metal hydroxides and fumed silica provide novel pseudoplastic aqueous dispersions.

BACKGROUND OF THE INVENTION

EPO publication 0 207 811 A3 equivalent of U.S. Pat. No. 4,990,2368 discloses substantially crystalline, monodispersed, monolayered mixed metal layered hydroxides (MMLH) of the general formula $$Li_m D_d T(OH)(m+2d+3+n \cdot a)(A^n)a \cdot qH_2O \qquad (I)$$

where:
m is from zero to about 1;
D represents divalent metal ions;
d is from zero to about 4;
T represents trivalent metal ions;
A represents monovalent or polyvalent anions or negative-valence radicals other than OH−ions;
a is the number of ions of A;
n is the valence of A;
n·a is from zero to about −3;
q is zero or more;
(m+d) is greater than zero; and
(m+2d+3+n·a) is equal to or greater than 3.

In the above formula, n·a means n multiplied by a, and the product of n·a is either zero or is negative.

For purposes of brevity, the expression MMLH will be used in this disclosure as an acronym for the mixed metal layered hydroxides which conform essentially to the generic formula shown above. In some cases other, more specific, identification of compounds will also be used in appropriate places.

Stated briefly, the preparation of the above-described MMLH compounds involves mixing together soluble compounds of the desired metals in the desired ratio and then, in a continuously flowing, steady state, flash co-precipitation technique, reacting the mixture with a source of OH−ions, such as NH4OH, to produce the substantially crystalline, monodispersed, monolayered MMLH compounds within the generic formula shown above. Further details of the process are available in the above-identified EPO application or in pending U.S. application Ser. No. 0,60,133, filed Jun. 9, 1987 (U.S. No. 4,990,268) which is related to the above-identified EPO application. Another patent, U.S. Pat. No. 4,790,954, discloses MMLH compounds as adducts with clay, such as bentonite, which are thickeners for water and other hydrophylic fluids. The references disclose the crystal thickness of the monodispersed, monolayered compounds as being in the 8 to 16 angstrom range, which is extremely small for a mixed metal crystal. The above patents and applications are incorporated herein by reference.

Fumed silica is well-known in industry as a highly pure, very fine particle size silica, $SiO_2$, which is usually made from $SiCl_4$, but can be made from $SiF_4$, e.g., in accordance with U.S. Pat. No. 4,059,680. Fumed silica particles are so fine, that they are sometimes referred to as "silica smoke". In this disclosure, the expression "FS" is used to signify "fumed silica".

SUMMARY OF THE INVENTION

It has now been unexpectedly found that fine particle size $SiO_2$, especially very fine particle size fumed silica (FS), in aqueous admixture with monodispersed monolayer MMLH crystals, interacts with the MMLH to provide novel aqueous dispersions which are highly pseudoplastic and which have a surprisingly high yield point in contrast to aqueous gels of the monodispersed monolayered MMLH without the FS. This high yield point is useful in providing aqueous gels which have not only the rapid gelation, upon shearcessation, for which MMLH gels are known, but also an enhanced resistance to the onset of shear-thinning.

Thus, in one aspect, the invention comprises the process of admixing fine particle $SiO_2$, especially FS, with at least one MMLH compound in an aqueous system whereby the $SiO_2$ (or FS) and MMLH interact to create a product comprising a highly pseudoplastic aqueous dispersion having a high yield point as compared to an aqueous gel of the MMLH alone. The interaction product of the MMLH and the $SiO_2$ Or (FS) shall be referred to herein as an adduct, and for purposes of brevity, written as "MMLH·$SiO_2$", "MMLH·FS" or, more formally, as "$Li_m D_d T(OH)(m+2d+3+na)(A^n)a \cdot qH_2O \cdot SiO_2$".

Another aspect is the novel MMLH·FS adduct itself, which not only has an enhanced yield point with respect to shear thinning, but also has rapid gelation upon cessation of the shear force.

Yet another aspect is the use of the novel MMLH·FS adduct as a viscosity modifier or rheology modifier in aqueous systems where high gel strength and rapid gelation properties are desirable.

Figure 1:
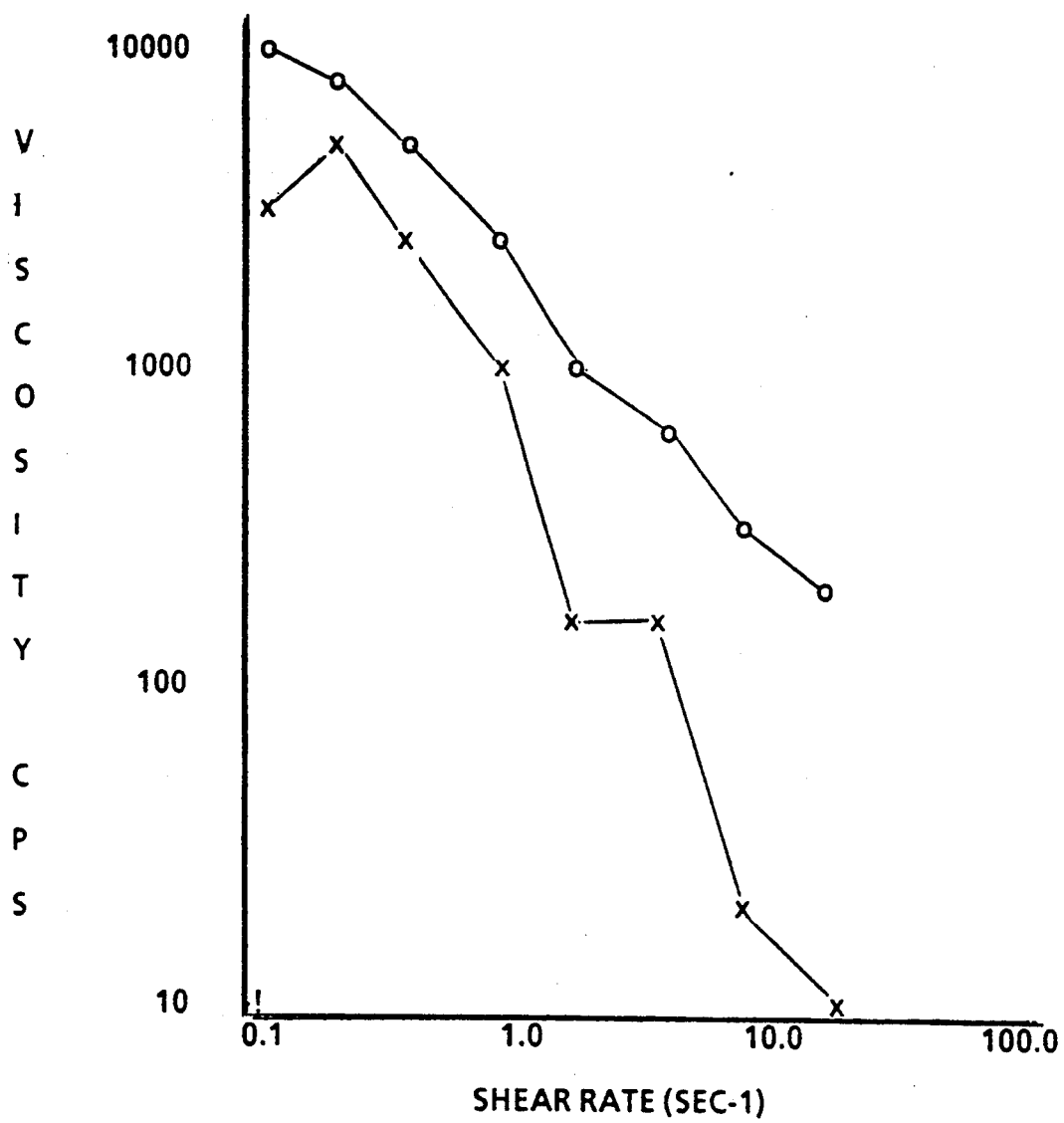
FIG. 1 is a graph of viscosity data from the procedure of Example 4 as a comparison illustration of an embodiment of the invention as compared to a control.

DETAILED DESCRIPTIONS, INCLUDING BEST MODE KNOWN:

The present inventive concept comprises (a) the process of interacting fine particle $SiO_2$, especially FS, with at least one MMLH compound in an aqueous medium to produce an adduct, MMLH·$SiO_2$, especially MMLH·FS, (b) the adduct produced by the interacting, and (c) the use of the adduct as a rheology modifier for aqueous systems.

In the generic formula for MMLH, the D metal can be Mg, Ca, Ba, Sr, Mn, Fe, Co, Ni, Cu, or Zn, preferably Mg, Ca, Co, Ni, Cu or Zn, most preferably Mg or Ca, or mixtures of these. The T metal can be Al, Ca, Cr, or Fe, preferably Al or Fe, most preferably Al. An especially preferred embodiment comprises Al as the T metal and Mg as the D metal.

The invention is described hereinafter, in sufficient detail to enable skilled practitioners to practice the inventive concept. The following descriptions employ representative and preferred embodiments.

The fumed silica (FS), may be prepared using methods which are taught in the literature, whether it be prepared from $SiCl_4$ or $SiF_4$ or some other method. Or commercially available FS can be used. For the experiments shown below, fumed silica (FS) sold under the trademark CAB-O-SIL ™ M5 is used. Fine particle sizes larger than the ones called "fumed" are also operable, but are not preferred. Furthermore, the purity of the synthetic SiO$_2$ is an advantage over finely-ground SiO$_2$-containing mineral clays in formulations wherein batch-to-batch variances of the feed ingredients of a mixture can upset the quality of production-line products.

The MMLH specie used in the following descriptions is a magnesium aluminum hydroxychloride (MAH for short) conforming essentially to the formula MgAl(OH)$_{5-a}$Clhd a·qH$_2$O, where all is about 0.3, but "a" can be from zero to about 1. In this formula, the chlorine is a residual amount resulting from the preparation of the MAH by making an aqueous solution of AlCl$_3$/MgCl$_2$ and then flash precipitating the mixture of metal salts using a source of OH$^-$ ions (NH$_4$OH in this case) to form the MAH, then substantially leaching out the NH$_4$Cl by-product. The presence of the residual chlorine in the MAH is usually neither essential nor especial harmful; however, the addition of a small amount of a base or buffer, e.g. Na$_2$CO$_3$, can be used to neutralize or off-set the effects of the chlorine and cause the MAH to be more alkaline and thicker. The preparation of MAH is disclosed in the above-identified references.

A naturally-occurring magnesium aluminum silicate clay used for comparison purposes in the examples below, is a refined montmorillonite clay sold by R. T. Vanderbilt under the trademark VAN GEL ES TM. A naturally-occurring attapulgite clay, sold under the trademark ATTAGEL TM 40 is also used. The naturally-occurring occurring clays are not within the scope of the generic formula for either MMLH or MMLH·SiO$_2$ and should not be confused with, or considered analogous with, any specie of the synthetic aluminates herein referred to as MMLH, MAH, or fine particle size SiO$_2$ of the present invention.

For purposes of conciseness, the VAN GEL ES will be identified in the examples below as Clay-A and the ATTAGEL 40 will be identified as Clay-B.

In the descriptions below, the preferred SiO$_2$, i.e. the FS, will be used, merely because it is the preferred type of fine particle SiO$_2$. The MMLH is represented in the descriptions and examples below by the preferred MAH specie.

It has been found that the most viscous and pseudoplastic structures occur when the MAH/FS weight ratio ranges from about 1 to about 10. When the MAH/FS weight ratio is much less than 1, e.g. 0.25, the synergism is not nearly as great as when the ratio is greater than 1. The MAH/FS combination is much more efficient in achieving desirable rheology than either component alone. It is also more efficient and provides higher yield values than two-component viscosifier systems based on MAH-clay adducts.

Yield Value describes the force required to start fluid in motion from rest. It is an indication of the system's viscosity at rest and its suspension ability. It is calculated as the difference between the 0.5 rpm and 1.0 rpm viscosities measured on a Brookfield viscometer, divided by 100.

Requisite amounts of the clay and the fumed silica, preferably in dry powder form, can be mixed into the aqueous MAH, using good stirring, to produce MAH-clay adduct or MAH·SiO$_2$ adduct, respectively. However, the clay or silica can be used as a concentrated aqueous slurry if one formulates the final mixture so as to account for the diluting effect of any water which enters the mixture with the clay or silica. It is recommended that a high-speed stirrer, such as a Waring TM blender or other such mixer, be used for several minutes (say about 5-10 minutes) followed by a low speed stirrer, such as a magnetic stirrer, for, say, about an hour or two. The exact stirring time is not critical and is done to assure good uniform dispersions. After the dispersions have been allowed to stand for a period of time of, say, from about 1 hour to several hours, the adduct slurry gels can be used for blending with other fluids for which viscosity adjustment is desired. In these present descriptions, all percentages and ratios are based on weight unless stated otherwise.

THE PROCESS, IN GENERAL, USED IN THE FOLLOWING EXAMPLES:

An MAH aqueous slurry of about 10% solids concentration is diluted with deionized water to the desired final concentration, accounting for any subsequent addition of clays or fumed silica. Clays or fumed silica are added in dry form to the MAH slurry while it is being stirred with a Waring Blender. The mixture is stirred on the Waring blender at high speed for 5 minutes. The mixture is subsequently stirred at slow speed with a magnetic stirrer for 1 hour. The temperature is measured at that point and, if necessary, the slurry is cooled to 23° C. for the viscosity measurement. Viscosity is measured immediately thereafter and in some cases at periodic intervals up to 28 days. The temperature and/or pressure at which the adduct is made is not particularly important, but ambient temperature and pressure is adequate (and preferred) and there is no need to employ superambient or subambient conditions except for adjustments to the temperature for the viscosity measurements in order to get comparable data among the various samples being tested.

It has been noticed that when MAH and SiO$_2$ are blended on a Waring blender to form the adduct there can be a temperature rise to as high as about 40°-50° C. in a few minutes, so cooling to room temperature (23° C.) for viscosity measurements is necessary. Mixtures of MAH and SiO$_2$ deliberately heated to as high as 70° C. to form the adduct and then cooled to room temperature for the viscosity measurements, had the same viscosity as if made at ambient temperatures.

A significant increase in the viscosity is readily perceived within about 15 seconds of the adduct preparation process, but stirring for a period of time (say, about 5 minutes) beyond that increase in viscosity will assure that the adduct is more thoroughly formed.

Having learned of this invention, one may vary somewhat from the general embodiment described above and the embodiments described below without departing from the purview of the present inventive concept.

The following illustrates specific embodiments, but the invention is not limited to these specific embodiments.

EXAMPLE 1

(Examples of invention vs. controls)

Viscosity measurements of MAH alone, FS alone, and MAH·FS adducts are compared as shown in the Table 1 data below, using a total solids concentration of 2.5% in aqueous dispersions as a control parameter and using ambient room temperature (about 23° C.) as another control parameter.

TABLE 1

| Solids in 2.50% Dispersion | Ratio | Yield Point: lbs/ft² |
|---|---|---|
| 2.50% MAH · 0.00% FS | — | 10 |
| 2.40% MAH · 0.10% FS | 24.0 | 70 |
| 2.25% MAH · 0.24% FS | 9.4 | 160 |
| 1.75% MAH · 0.75% FS | 2.3 | 150 |
| 1.50% MAH · 1.00% FS | 1.5 | 100 |
| 1.25% MAH · 1.25% FS | 1.0 | 110 |
| 1.00% MAH · 1.50% FS | 0.66 | 60 |
| 0.75% MAH · 1.75% FS | 0.43 | 30 |
| 0.25% MAH · 2.25% FS | 0.10 | 20 |
| 0.00% MAH · 2.50% FS | — | 10 |

The above data demonstrate that at a given total solids concentration, the highest yield points are obtained with MAH·FS adducts having MAH/FS ratio of about 1/1 to about 10/1, though some improvement is found in all the examples which contain the adducts. The first of the above samples, i.e., the MAH without FS is "activated" with a small amount of $Na_2CO_3$ to buffer the pH to be more alkaline and to give it a measurable viscosity at rest. In the other samples, no $Na_2CO_3$ is added to the MAH because the FS is the activator.

Example 2

(Comparison between invention/noninvention)

In substantially the same manner as in Example 1 above, aqueous dispersions of some MAH-clay adducts (non-invention) are compared with MAH·FS adducts (invention), though not at the 2.5% total solids parameter of Example 1. Table 2 contains the data.

TABLE 2

| Dispersion Solids | Ratio: MAH/other | Yield Point: lbs/ft² |
|---|---|---|
| 1% MAH · 2% Clay-A | 0.5 | 120 |
| 2% MAH · 2% Clay-A | 1.0 | 10 |
| 1% MAH · 2% Clay-B | 0.5 | 140 |
| 2% MAH · 1% Clay-B | 2.0 | 8 |
| 1% MAH · 2% FS | 0.5 | 5 |
| 2% MAH · 1% FS | 2.0 | 210 |

The above data demonstrate that while an adduct having more clay than MAH gives higher yield points, the opposite is true of the adducts of FS with MAH.

EXAMPLE 3

The samples of Example 1 above are essentially repeated except that 5% by weight of NaCl is added to the dispersions of adducts to find its effect on viscosity. While the NaCl can have its own "activating" effect by increasing the viscosity of MAH alone or MAH adducts with small amounts of FS, it is found that the highest yield points are obtained with the adducts which have MAH/FS ratios in the range of 1 to 10, similar to the results shown in Example 1.

EXAMPLE 4

(Use of adduct in cleanser)

There is not usually a significant problem with flow of a liquid cleanser when deposited on a horizontal surface, but when a cleanser is applied to a vertical or slanted surface, it generally tends to flow downwardly under the force of gravity. There is a perceived need to provide gelation (viscosity control) to a cleanser which has a high enough yield point to be able to resist flowing under the force of gravity, yet which can be removed by wiping or other means.

In order to test the effects of the MAH·FS adduct on a commercially available cleanser, about 2.5% by weight of MAH·FS adduct, having a MAH:FS ratio of 1:1, is added to a commercially available aqueous-based cleanser containing EDTA (ethylene diamine tetraacetic acid) as the effective principal ingredient and sold as a bathroom cleanser. There is a beneficial increase in the viscosity of the cleanser, causing it to cling significantly better when applied to vertical surfaces awaiting the wiping-off step of the cleansing procedure. The adduct-modified cleanser rapidly re-gells upon cessation of shearing forces (i.e., the applying or wiping step).

FIG. 1 is a log/log graph of viscosity measurements, in centipoise, as determined on a Brookfield viscometer, of mixtures as described above. The "X" datapoints denote measurements of the unmodified bathroom cleanser ("control") and the "0" datapoints denote the cleanser with 2.5% by weight of MAH·FS adduct ("invention") added to it. As indicated by the data, there is a significant difference in the viscosity as the shear rate is increased. At a shear rate of about 30 sec−1 the viscosity of the "control" is shown as being about 15 cps compared to the "invention" at about 400 ops. The aberrations in the datapoints for each curve are considered to be inconsequential, considering the margin of error which can be encountered in measuring viscosity at low shear rates, but the general slope of the curve is believed to be representative of the results which one can expect from the practice of the present invention.

Upon cessation of shearing forces, the modified cleanser, containing the adduct of the present invention, is found to gel instantly, whereas the unmodified cleanser remains flowable under the force of gravity for a brief period which is long enough for some to "run" down the substrate.

What is claimed is:

1. The process which comprises interacting, in an aqueous medium, fine particle fumed silica with at least one substantially crystalline mixed metal layered hydroxide, MMLH, conforming generally to the fomrula

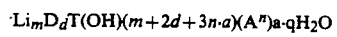

$$Li_m D_d T(OH)(m+2d+3n \cdot a)(A^n)a \cdot qH_2O \qquad (I)$$

where:
  m is from zero to about 1;
  D represents divalent metal ions;
  d is from zero to about 4;
  T represents trivalent metal ions;
  A represents monovalent or polyvalent anions or negative-valence radicals other than OH ions;
  a is the number of ions of A;
  n is the balance of A;
  n·a is from zero to about −3;
  q is zero or more;
  (m+d) is greater than zero; and
  (m+2d+3+n·a) is equal to or greater than 3, and whereby there is formed the adduct, MMLH·fumed silica.

2. The process of claim 1 wherein D represents at least one divalent metal of the group consisting of Mg, Ca, Ba, Sr, Mn, Fe, Co, Ni, Cu, and Zn and wherein T represents at least one trivalent metal of the group consisting of Al, Ga, Cr, and Fe.

3. The process of claim 1 wherein D represents at least one divalent metal of the group consisting of Mg, Ca, Co, Ni, Cu, and Zn, and wherein T represents at least one trivalent metal of the group consisting of Al and Fe.

4. The process of claim 1 wherein the D metal is Mg and the T metal is Al.

5. The process of claim 1 wherein the mixed metal layered hydroxide conforms essentially to the formula $Mg_aI(OH)_{5-a}(Cl^-)_a$, where a can be zero to 1.

6. The process of claim 1, wherein the weight ratio of mixed metal layered hydroxide to fumed silica is in the range of from about 1 to about 10.

7. The MMLH· fumed silica adduct produced by the process of claim 1.

* * * * *

UNITED STATES PATENT AND TRADEMARK OFFICE
CERTIFICATE OF CORRECTION

PATENT NO. : 5,273,728

DATED : December 28, 1993

INVENTOR(S) : Peter A. Doty

It is certified that error appears in the above-identified patent and that said Letters Patent is hereby corrected as shown below:

Column 6, line 42, "$Li_m D_d T(OH)(m+2d+3n \cdot a)(A^n)a \cdot qH2O$", should correctly read, --$Li_m D_d T(OH)(m+2d+3+n \cdot a)(A^n)a \cdot qH2O$--.

Signed and Sealed this

Sixteenth Day of May, 1995

Attest:

BRUCE LEHMAN

*Attesting Officer*  *Commissioner of Patents and Trademarks*